Jan. 31, 1933.  A. BÜCHI  1,895,538
INTERNAL COMBUSTION ENGINE
Filed Nov. 26, 1926   4 Sheets-Sheet 1

Inventor:
Alfred Büchi
By [signature]
Atty

Jan. 31, 1933. A. BÜCHI 1,895,538
INTERNAL COMBUSTION ENGINE
Filed Nov. 26, 1926 4 Sheets-Sheet 2
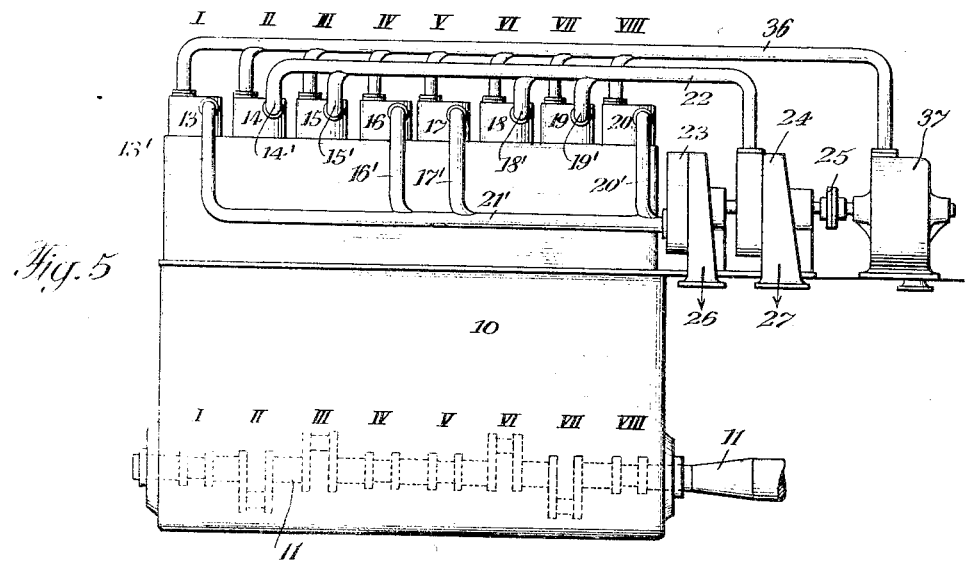
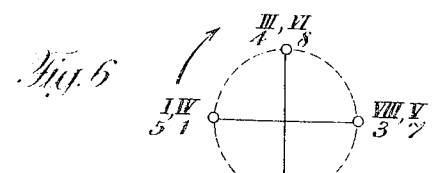
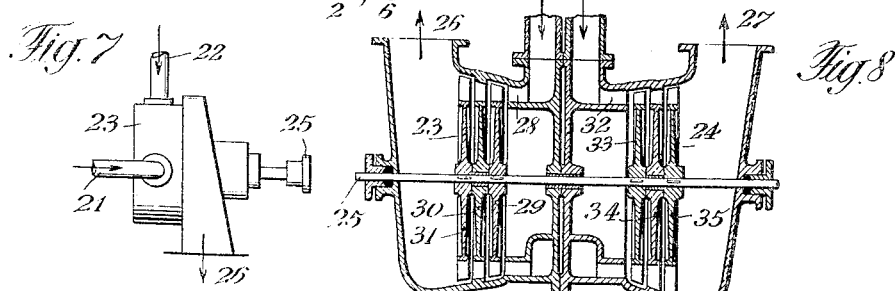

Jan. 31, 1933.  A. BÜCHI  1,895,538
INTERNAL COMBUSTION ENGINE
Filed Nov. 26, 1926   4 Sheets-Sheet 3
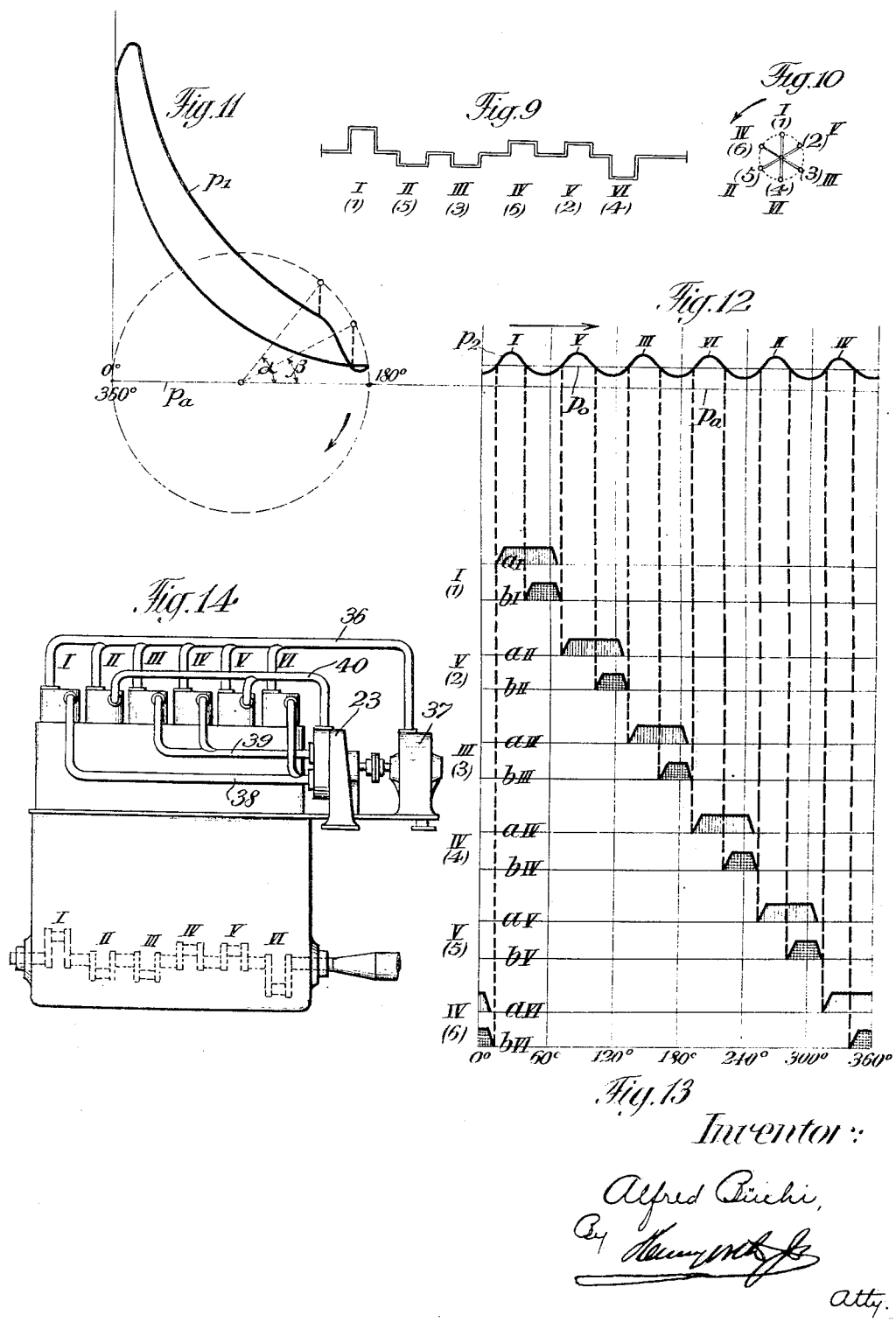

Jan. 31, 1933.   A. BÜCHI   1,895,538
INTERNAL COMBUSTION ENGINE
Filed Nov. 26, 1926   4 Sheets-Sheet 4
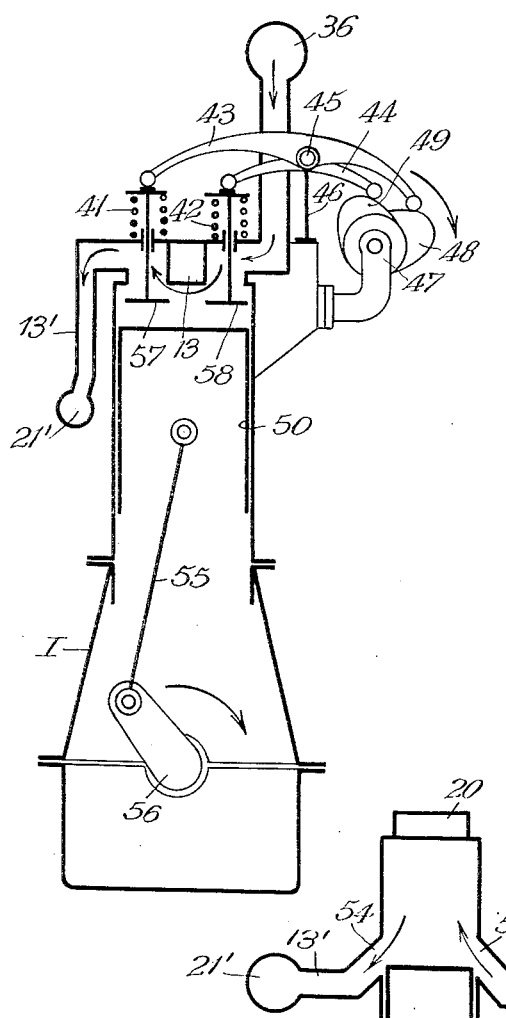
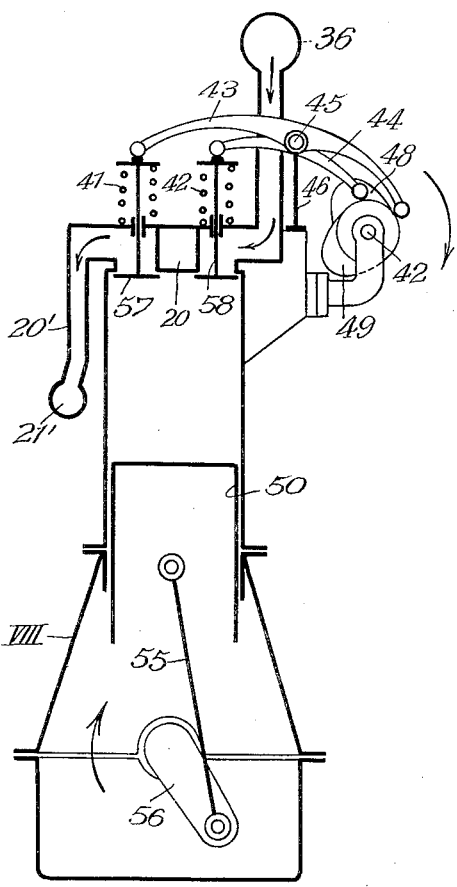
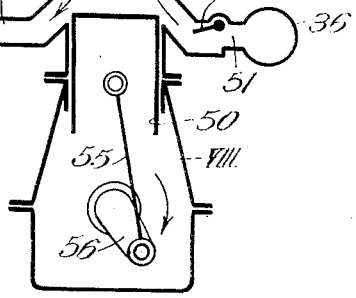
Inventor:
Alfred Büchi,
By Sommers & Young
Attys.

Patented Jan. 31, 1933

1,895,538

UNITED STATES PATENT OFFICE

ALFRED BÜCHI, OF WINTERTHUR, SWITZERLAND

INTERNAL COMBUSTION ENGINE

Application filed November 26, 1926, Serial No. 150,951, and in Switzerland November 30, 1925.

The present invention relates to improvements in compound internal combustion engines having a precompressor and an exhaust turbine. With the engine according to the present invention the entrance areas of the exhaust turbine as well as the cross-section and the contents of the conduits leading the exhaust gases to the exhaust turbine are so dimensioned and the moments of the discharge of the exhaust gases are so chosen that after the start of the exhaust period the pressure in front of the exhaust turbine rises above that of the charging pressure and only at the end of the exhaust period drops to a lower height which is preferably above atmospheric pressure. By this pressure rise in front of the turbine a larger output of the latter is obtained. Thereby it is possible to deal with a larger quantity of air for charging or scavenging purposes or to compress the latter to a higher pressure in case the turbine drives the compressor for the charging air or for the scavenging air or for both. By the low pressure in the engine cylinders at the end of the exhaust period, it is obvious that the weight of the residual gases in the cylinders is small. The new charge is therefore less heated so that the weight of the charge entering into the combustion cylinders becomes greater. The beginning of the exhaust of a cylinder must occur so late that the generation of the lower pressure in another cylinder exhausting previously into the same exhaust manifold is not prevented by the bulk of the exhaust gases.

The dimensions of the conduits leading the exhaust gases to the turbine may be so chosen that, at least with determined loads, the lowest pressure in front of the turbine is lower than the pressure of the pre-compressed charge. In this case each engine cylinder may be scavenged with fresh charge. Care has only to be taken that the organs controlling the inlet and the outlet of the same engine cylinder are simultaneously opened during the scavenging action and that the exhaust organ of the cylinder which is the next to exhaust opens only so late that no rise of pressure which is too abrupt and which prevents the scavenging action occurs in the conduit to the turbine. The controlling periods are to be determined according to the number of engine cylinders exhausting into the same conduit. For instance with four-stroke cycle engines worked according to the present invention the opening of the inlet organs of the cylinders must be caused earlier and the opening of the exhaust organs later than is the case with the known four-stroke cycle engines, this is particularly necessary if towards the end of the exhaust stroke a pressure that is as low as possible has to be obtained. The inlet valve opens earlier than is customary, so that with the resulting drop of pressure the scavenging air has more time for its passage through the cylinder. The closing of the exhaust is retarded so that the scavenging period is longer and takes place near the dead point of the pistol travel where the scavenging air, by reason of the small piston speed, can be blown through the cylinder with the least resistance. This also has the advantage, that at the dead point the piston is at its highest point and only a small chamber or space at which the highest temperature exists is swept by the air. The late opening of the exhaust means in a cylinder causes the low pressure period in the exhaust conduit to last longer so that the cylinder, being at the end of the exhaust period and communicating with this conduit through its exhaust valve gets discharged at a low pressure, thereby improving its scavenging.

If, particularly with four-stroke cycle engines, more than 4 or 5 cylinders exhaust into a common conduit leading to the turbine it may happen, especially at increased loads, that the lower limit of the exhaust pressure in front of the turbine cannot be adjusted at all or for a sufficiently long period to be below the charging pressure as the exhaust of the single cylinders follow each other too quickly. In order to improve these disadvantageous conditions several conduits may lead from the engine cylinders to the turbine so that for instance three or more cylinders are provided with a common exhaust conduit. Thereby the arrangement is preferably so chosen that those cylinders exhaust into common conduits which exhaust in intervals that are as equal as possible. Thereby a uniform charging, scavenging and exhausting process in the single combustion cylinders is obtained and also the operation of the turbine is more favorable. The different exhaust conduits may lead to one or more turbines.

In the accompanying drawings the manner of operation and the arrangement of the engines which operate in that manner are illustrated by way of example.

Fig. 5 is a diagrammatic elevation of an 8-cylinder four-stroke cycle internal combustion engine having two exhaust turbines and Fig. 6 shows diagrammatically the arrangement of the cranks of the main shaft.

Figs. 7 and 8 illustrate constructional examples of exhaust turbines.

Figs. 9–14 refer to a six-cylinder two-stroke cycle internal combustion engine in particular, Figs. 9 and 10 show the arrangement of the cranks of the engine shaft, Fig. 11 shows a diagram of the pressure variations inside an engine cylinder over a complete revolution of the crank, Fig. 12 shows the pressure variation in front of the turbine, Fig. 13 illustrates the valve lift diagrams of the inlet and outlet organs, Fig. 14 shows the aggregate in an elevation view, Figs. 15 and 16 are diagrammatic side sectional views of a four-stroke cycle engine having valve timing mechanism according to this invention, and Fig. 17 is a diagrammatic side sectional view of a two-cycle engine according to this invention.

Figure 1:
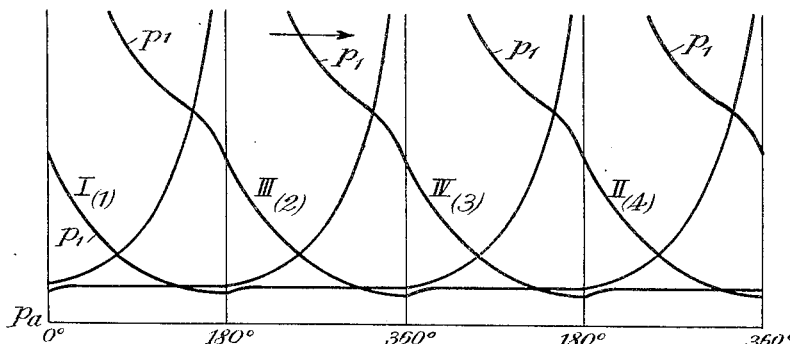
Fig. 1 shows in a diagram the pressure variations inside the cylinders of a four-stroke cycle internal combustion engine having four cylinders plotted as ordinates over two total revolutions of the engine crank shaft as abscisses.
Figure 2:
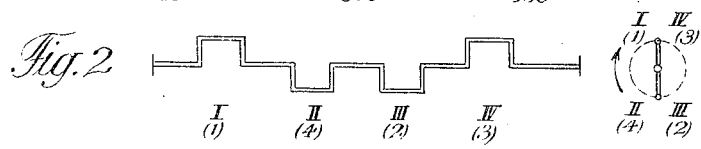
Fig. 2 shows the arrangement of the cranks of the engine crank shaft.

In Fig. 1 the pressures inside the combustion cylinders are indicated by the curves $p_1$. I, II, III and IV denote the four cylinders arranged one beside the other in the stated sequence. In the cylinders the working processes or proceedings according to the numerals 1, 2, 3, and 4 respectively follow each other so that after a turning of the crank shaft through 180° each proceeding is repeated. Fig. 2 shows the position of the cranks of the internal combustion engine in an elevation view and in a side view which position ensures that the single proceedings are repeated in equal intervals.

The pressure curve of cylinder III, (2) in Fig. 1 shows combustion and expansion taking place, from 0° to 180°. Let it be assumed that the outlet organ opens before the position of 180° is reached. According to the invention the dimensions of the conduit to the turbine are so chosen that the exhaust pressure does not suddenly drop the moment the outlet organ is opened, but is reduced comparatively slowly during the further turning of the crank shaft from 180° towards 360°. It is assumed in Fig. 1 that this pressure drops to a limit somewhat lower than the charging pressure which is then present during the suction stroke from 360° to 180° of the second revolution of the crank shaft. During the further turning of the crank shaft from 180° to 360° the charge in the cylinder is compressed. The part of the pressure curves $p_1$ which indicates the end of the compression, of the combustion and the beginning of the expansion are not shown in the diagram in order to avoid too small a scale of the diagram. The combustion may take place in the manner of an explosion, or of a combustion under constant pressure or in any other manner.

Figure 3:
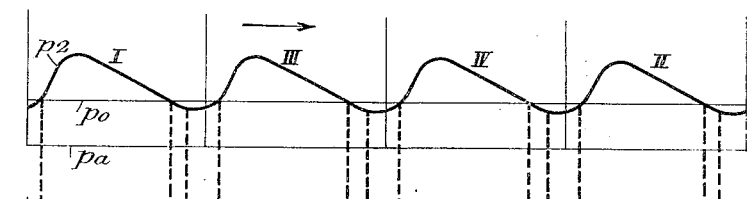
Fig. 3 shows the pressure variation in front of the turbine.

Fig. 3 shows the influence of the manner of operation on the pressure in the exhaust conduit. In the neighbourhood of 180° of the first revolution of the engine, i. e. shortly afterwards, the pressure $p_2$ increases quickly and drops below the charging pressure $p_0$ when 360° is approached. At about 360° the same proceeding is repeated which is now caused by the exhaust gases from cylinder IV and so on, $p_a$ denotes atmospheric pressure in Fig. 1 as well as in Fig. 3 from which may be seen that the engine is worked with a pre-compressed charge.

Figure 4:
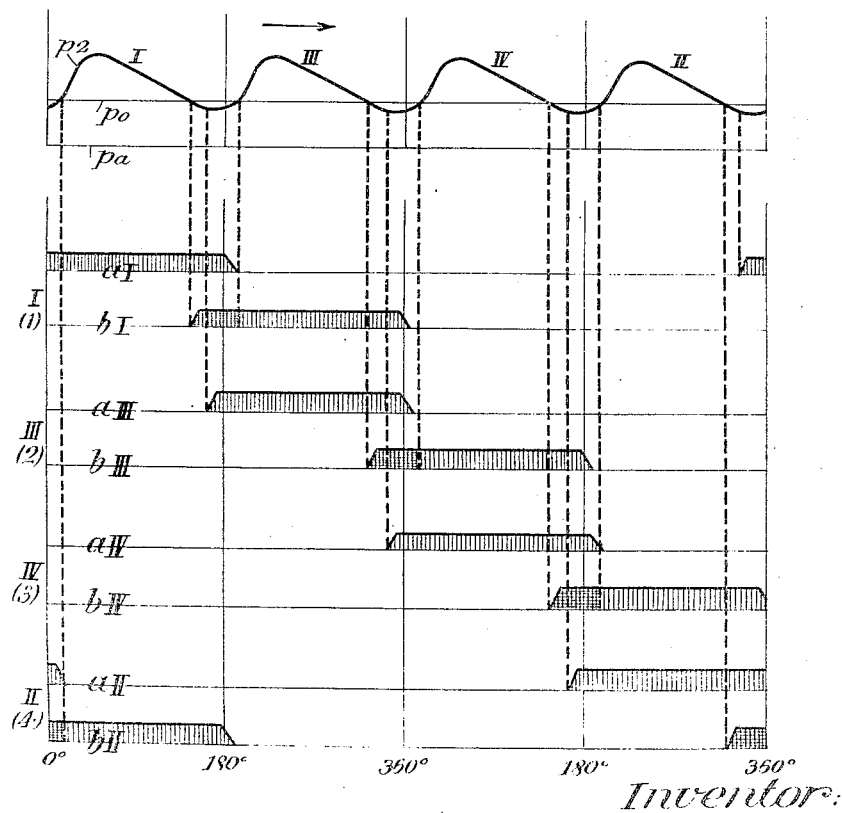
Fig. 4 shows the valve lift diagrams of the inlet and outlet organs of the four-cylinder engine.

Referring now to the valve lift curves $a_{III}$ and $b_{III}$ of the cylinder III, (2) in Fig. 4, of which the first curve is that of the lift of the exhaust organ and the second of the inlet organ, it will be noted that shortly before 180° of the first revolution the exhaust organ opens and closes only somewhat after 360°. In this moment, as will be seen from Fig. 3, the pressure in the exhaust conduit starts to rise above the charging pressure $p_0$ as the exhaust organ of cylinder IV has opened previously in accordance with the valve lift curve $a_{IV}$ and the gases flowing into the exhaust conduit have raised again the pressure in the latter. The moment in which during the first revolution of the crank shaft the pressure $p_2$ drops below the pressure $p_0$ the inlet organ of the cylinder III may be opened as is indicated by the curve III. This organ may now be kept open up to the end of the suction stroke at about 180° of the second revolution of the crank shaft. Between the first and the second revolutions of the crank shaft, i. e. before and after the angle of 360°, the inlet and outlet organs are simultaneously opened and a scavenging by means of fresh charge may be effected if the pressure $p_0$ is higher than $p_2$ as is indicated in Fig. 3. The scavenging period is brought into prominence in the valve lift curves of the inlet organs $b_I$, $b_{II}$, $b_{III}$ and $b_{IV}$ respectively by a horizontal hatching.

In Fig. 5 an 8-cylinder four-stroke cycle internal combustion engine is illustrated. I, II, III, IV, V, VI, VII and VIII are the eight cranks of the main crank shaft 11. 10 denotes the engine frame on which the combustion cylinders are fixed and 13, 14, 15, 16, 17, 18, 19 and 20 are the cylinder covers. In Fig. 5 the exhaust conduits 13', 14', 15', 16', 17', 18', 19' and 20' are shown which serve to lead the exhaust gases to the turbines. The exhaust conduits of every four cylinders, i. e. of 13, 16, 17, and 20 and 14, 15, 18 and 19 respectively are connected to a common conduit 21' or 22 respectively which lead to separate turbines 23 and 24 respectively. Both turbines 23 and 24 work on the same shaft 25. 26 and 27 are the exhaust conduits of these turbines. 37 is the pre-compressor and 36 the conduit leading the compressed air to the cylinders.

Fig. 6 shows the positions of the cranks as well as the sequence of the ignition in the cylinders similarly shown as in Fig. 2. It may thus be seen that the exhaust conduits which end in a common conduit 21' or 22 respectively, belong to those cylinders the appertaining cranks of which are situated in the same plane, which is also the case with the crank shaft illustrated in Fig. 2. The ignitions in these cylinders thus follow each other at every 180° turn of the crank shaft; the same is the case with the sequence of ignitions of the other four cylinders, however the latter are displaced against the former through an angle of 90°.

Figs. 15 and 16 show diagrammatic cross sections through a four-stroke cycle engine, having inlet valve 58 and exhaust valve 57. The inlet valve 58 is operated by means of cam 49, lever 44 and spring 42. Lever 44 is fulcrumed at 45, supported by bracket 46. Exhaust valve 57 is operated by cam 48, lever 43 and spring 41, lever 43 also fulcrumed at 45. These cams 48 and 49 are on cam shaft 42 which latter is supported by bracket 47. Fig. 15 shows the piston 50 near the top dead center during the scavenging period with inlet valve 58 and exhaust valve 57 simultaneously open. In Fig. 16 the piston 50 is nearing the end of the power stroke, shortly before the exhaust valve 57 opens. Connecting rod 55 transmits the power to crank-shaft 56.

Instead of two turbines only one may be provided as is shown in Fig. 7. 21' and 22 denote again the conduits for supplying the exhaust gases to the single turbine 23, for instance at two entrance areas separated from each other. 25 is the shaft of this turbine.

Two turbines may be built together as is shown in Fig. 8, whereby the axial thrust is compensated. This turbine is provided with two inlet parts 28 and 32 to which the exhaust gases are supplied by the conduits 21 and 22. Each of the turbines comprises further two rotor wheels 29 and 31 or 33 and 35 respectively and a guide wheel 30 or 34 interposed between the respective rotor wheels. From the turbines the exhaust gases flow into the conduits 26 and 27 and from there either directly or through further devices into the surrounding atmosphere. The rotor wheels are mounted on a common shaft 25. Instead of building the two turbines together two independent turbines may be provided.

The present invention may also be applied to engines working according to the two-stroke cycle method, as is illustrated in Figs. 9–14 which refer to a six-cylinder two-stroke cycle engine. Figs. 9 and 10 show the crank shaft and the position of the cranks I, II, III, IV, V and VI. The sequence of ignitions in the cylinders is indicated by the numerals 1–6 in brackets. In Fig. 11 the pressure in a working cylinder is shown. The uncovering of the outlet ports occurs when the crank occupies the angle $\alpha$ and the scavenging and charging ports are uncovered when the crank is in the position defined by the angle $\beta$.

By the proper dimensioning of the entrance areas of the turbine and of the cross-section of the conduits for the exhaust gases interposed between the engine and the turbine and by suitably timing the inlet and outlet by means customary with internal combustion engines, and therefore need not be described, an increase of the pressure $p_2$ in front of the turbine is obtained shortly after the opening of the exhaust means, as illustrated in the diagram of Fig. 12. This increase in pressure above the charging and scavenging pressure $p_0$ is followed by a reduction in said pressure $p_2$ below the charging pressure $p_0$ as is shown by the pressure curve $p_2$ whereupon the same proceeding is repeated in another cylinder. Thereby care has to be taken that the exhaust in a further cylinder does not occur so early as to impair the scavenging and charging process in the cylinder which exhausted previously. To prevent any such impairing the cylinders are subdivided in groups and every group has its separate exhaust conduit. Such an arrangement is illustrated in Fig. 14, in which cylinders I and VI exhaust into the conduit 38, cylinders II and V into the conduit 40 and cylinders III and IV into the conduit 39. It will be seen from Fig. 10 that the exhausts of every two cylinders into their common exhaust conduit occurs every half a revolution of the crank shaft. The exhaust conduits 38, 39 and 40 lead to a single turbine 23.

Fig. 13 shows the valve lift diagrams which give the desired pressure curves; with two stroke cycle engines the inlet and outlet organs are ordinarily not valves but ports in the cylinder wall so that the diagrams of Fig. 13 are not exactly valve lift diagrams but diagrams showing the uncovering of the ports.

The curves $a_I$ to $a_{VI}$ are for the exhaust, and those $b_I$ to $b_{VI}$ are for the inlet.

As the valves nor the ports form any constituent part of the invention and are well known in the art, applicant omits such details for purposes of clearness. Check valves or controlled valves near the inlet ports are known, see Fig. 17, and it is obvious that means are provided for in an engine according to applicant's invention, but said means are omitted for purposes of clearness. The diagram shows that while the inlets remain closed the exhausts so open that there are rises of pressure in the supply conduits of the turbine 23, according to the pressure indications in Fig. 12, and that the inlet valves only open when the pressures ahead of the turbine drop.

Fig. 13 also shows that the inlet and outlet ports of the same cylinder close at about the same time, and that the exhaust of the succeeding cylinder only opens when the exhaust of the preceding cylinder has closed. Consequently it results that the end of curve $a_I$ terminates at the beginning of curve $a_{II}$. As it requires a short time for exhaust gas passing into the exhaust conduit to build up the pressure therein, there can be a small overlapping of the time of closure of $a_I$ and the beginning of $a_{II}$, as is shown by the curves.

Timing of inlet and exhaust ports according to Fig. 13 may be accomplished by an arrangement shown in Fig. 17. Inlet ports 53 and exhaust ports 54 are in the cylinder wall. Inlet pipe 51, in which a check valve 52 is inserted, leads to inlet ports 53. On the stroke of the piston towards the crankshaft (powerstroke) the pressure within the cylinder is substantially above atmospheric pressure in the moment when inlet and exhaust ports are uncovered by the piston. Check valve 52 closes therefore and the combusted gases escape through the exhaust ports 54. As soon as the pressure within the cylinder falls below the charging pressure, check valve 52 opens and scavenging and charging air sweeps through the cylinder until the piston covers the inlet ports.

I claim:—

1. A prime mover aggregate comprising in combination, an internal combustion engine having a plurality of combustion cylinders divided into groups, an exhaust pipe for each group of cylinders, a compressor for precompressing the charge of the engine, at least one exhaust turbine having several admission chambers, and each exhaust pipe being separately connected to a turbine admission chamber, and inlet and outlet means provided for the combustion cylinders, the dimensions of said exhaust pipes and of the inlet section of the turbine being so small and the moment of the discharge of the exhaust gases from the combustion cylinders being so late as to build up a pressure ahead of the turbine higher than the charging pressure near the beginning of the exhaust period with a subsequent drop of pressure to below precompression pressure near the end of said exhaust period.

2. A prime mover aggregate comprising in combination an internal combustion engine having a plurality of combustion cylinders, inlet and exhaust means in said combustion cylinders, an exhaust turbine, a compressor, means to connect said exhaust turbine to said compressor, said exhaust turbine and said compressor being independent of said internal combustion engine, means to convey the charge from said compressor to said internal combustion engine, said turbine having an admission space, an exhaust conduit interposed between said combustion cylinders and said admission space, the dimensions of said exhaust conduit and of said turbine admission space and the timing of the discharge of the exhaust gases from the combustion cylinders being adjusted so that after the beginning of the exhaust period the pressure ahead of the exhaust turbine rises to a value substantially higher than the charging pressure and falls to its lowest value, which is lower than the charging pressure, near the end of the exhaust period or at the beginning of the following inlet period, inlet and exhaust means kept simultaneously open during the low pressure period on the exhaust side, whereby said combustion cylinders are scavenged, and the outlet means of the cylinder which is next to exhaust into the same exhaust conduit being opened so late that the rise in pressure in said exhaust conduit does not interfere with the scavenging action.

3. In combination in a power plant, a multi-cylinder internal combustion engine, an exhaust turbine, an air compressor for supplying compressed air to the engine driven by the exhaust turbine, an intake manifold connecting the compressor with the engine cylinders, an exhaust manifold for receiving exhaust gases and scavenging air from the cylinders and conveying the gases and air to the turbine, the volumetric capacity of the exhaust manifold being so small and the turbine inlet area from the manifold being so small that upon exhaust of a cylinder to the exhaust manifold the pressure in said exhaust manifold rises above the pressure of the air supplied the engine by the compressor, means for opening a cylinder to the exhaust manifold, means for opening said cylinder to the intake manifold after the exhaust manifold pressure has fallen below the pressure of the air supplied the engine while retaining communication between the cylinder and the exhaust manifold whereby the cylinder is scavenged, means for opening another cylinder to the exhaust manifold and means for closing the first-mentioned cylinder from the exhaust manifold before the pressure in the exhaust manifold rises above the pressure of the air supplied the engine, whereby the operation of the exhaust turbine is affected by periodic high exhaust pressure while the engine is scavenged by air at pressure less than the highest exhaust pressure.

4. A prime mover aggregate comprising in combination an internal combustion engine having a plurality of combustion cylinders, inlet and exhaust means in said combustion cylinders, an exhaust turbine, a compressor, means to connect said exhaust turbine to said compressor, said exhaust turbine and said compressor being mechanically independent of said internal combustion engine, conduit means between said engine and said compressor, said exhaust turbine being provided with separate admission spaces, a separate exhaust conduit from the engine to each admission space, a plurality of combustion cylinders connected to each of said separate exhaust conduits, the dimensions of said exhaust conduits and of said admission spaces and the release of the exhaust gases from the combustion cylinders being adjusted so that after the beginning of the exhaust period in one of the cylinders the pressure ahead of the turbine quickly rises to its maximum which is substantially above the charging pressure and gradually decreases to its minimum near the end of the exhaust period, said minimum being substantially below the charging pressure, inlet and exhaust means kept simultaneously open during the low pressure period on the exhaust side, whereby said combustion cylinders are scavenged, and the outlet means of the cylinder which is next to exhaust into the same exhaust conduit being opened so late, that the rise in pressure in said exhaust conduit does not interfere with the scavenging action.

In testimony whereof, I have signed my name to this specification.

ALFRED BÜCHI.